United States Patent
Dunning

(10) Patent No.: US 8,667,295 B1
(45) Date of Patent: *Mar. 4, 2014

(54) ENCODING A VALIDITY PERIOD IN A PASSWORD

(75) Inventor: Ted E. Dunning, Mountain View, CA (US)

(73) Assignee: **Gordon * Howard Associates, Inc**, Littleton, CO (US)

( * ) Notice: Subject to any disclaimer, the term of this patent is extended or adjusted under 35 U.S.C. 154(b) by 1124 days.

This patent is subject to a terminal disclaimer.

(21) Appl. No.: 12/631,493

(22) Filed: Dec. 4, 2009

Related U.S. Application Data

(63) Continuation of application No. 10/856,968, filed on May 28, 2004, now Pat. No. 7,650,509.

(60) Provisional application No. 60/539,892, filed on Jan. 28, 2004.

(51) Int. Cl.
*G06F 21/00* (2013.01)

(52) U.S. Cl.
USPC ............................. 713/184; 713/170; 713/186

(58) Field of Classification Search
USPC ........................ 713/170, 184, 186; 726/5, 6, 9
See application file for complete search history.

(56) References Cited

U.S. PATENT DOCUMENTS

| | | | |
|---|---|---|---|
| 4,335,370 A | 6/1982 | Scalley et al. | |
| 4,592,443 A | 6/1986 | Simon | |
| 4,624,578 A | 11/1986 | Green | |
| 4,688,026 A | 8/1987 | Scribner et al. | |
| 4,700,296 A | 10/1987 | Palmer, Jr. et al. | |
| 4,738,333 A | 4/1988 | Collier et al. | |
| 4,800,590 A | 1/1989 | Vaughan | |
| 5,014,206 A | 5/1991 | Scribner et al. | |
| 5,132,968 A | 7/1992 | Cephus | |
| 5,228,083 A | 7/1993 | Lozowick et al. | |
| 5,426,415 A | 6/1995 | Prachar et al. | |
| 5,490,200 A | 2/1996 | Snyder et al. | |
| 5,495,531 A | 2/1996 | Smiedt | |
| 5,510,780 A | 4/1996 | Norris et al. | |
| 5,619,573 A | 4/1997 | Brinkmeyer et al. | |

(Continued)

FOREIGN PATENT DOCUMENTS

| | | |
|---|---|---|
| EP | 1557807 | 7/2005 |
| WO | 9616845 | 6/1996 |

(Continued)

OTHER PUBLICATIONS

The Credit Chip 100, printed Dec. 21, 2006 from www.c-chip.com.

(Continued)

*Primary Examiner* — Farid Homayounmehr
*Assistant Examiner* — Suman Debnath
(74) *Attorney, Agent, or Firm* — Conley Rose, P.C.

(57) ABSTRACT

A password authentication mechanism is capable of determining whether a password has expired without referring to a database or other information repository. Additional information can be encoded in the password without unduly lengthening the password, so that the additional information can be extracted from the password when the user provides the password for authentication purposes. Thus, the password serves as an information-carrying data item as well as acting as an authentication mechanism. Such a password can be used, for example, to provide time-limited access to a vehicle in response to receipt of timely payment, and to disable the vehicle if payment is not made.

9 Claims, 6 Drawing Sheets

(56) References Cited

U.S. PATENT DOCUMENTS

| | | | |
|---|---|---|---|
| 5,673,318 A | 9/1997 | Bellare et al. | |
| 5,708,712 A | 1/1998 | Brinkmeyer et al. | |
| 5,775,290 A | 7/1998 | Staerzi et al. | |
| 5,797,134 A | 8/1998 | McMillan et al. | |
| 5,818,725 A | 10/1998 | McNamara et al. | |
| 5,819,869 A | 10/1998 | Horton | |
| 5,898,391 A | 4/1999 | Jefferies et al. | |
| 5,917,405 A | 6/1999 | Joao | |
| 5,969,633 A | 10/1999 | Roser | |
| 5,970,143 A | 10/1999 | Schneier et al. | |
| 6,025,774 A | 2/2000 | Forbes | |
| 6,026,922 A | 2/2000 | Horton | |
| 6,032,258 A | 2/2000 | Godoroja et al. | |
| 6,064,970 A | 5/2000 | McMillan et al. | |
| 6,088,143 A | 7/2000 | Bang | |
| 6,130,621 A | 10/2000 | Weiss | |
| 6,157,317 A | 12/2000 | Walker | |
| 6,185,307 B1 | 2/2001 | Johnson, Jr. | |
| 6,195,648 B1 | 2/2001 | Simon et al. | |
| 6,225,890 B1 * | 5/2001 | Murphy | 340/426.19 |
| 6,232,874 B1 * | 5/2001 | Murphy | 340/426.19 |
| 6,249,217 B1 | 6/2001 | Forbes | |
| 6,278,936 B1 | 8/2001 | Jones | |
| 6,353,776 B1 | 3/2002 | Rohrl et al. | |
| 6,370,649 B1 | 4/2002 | Angelo et al. | |
| 6,380,848 B1 | 4/2002 | Weigl et al. | |
| 6,401,204 B1 | 6/2002 | Euchner et al. | |
| 6,429,773 B1 | 8/2002 | Schuyler | |
| 6,489,897 B2 | 12/2002 | Simon | |
| 6,587,739 B1 | 7/2003 | Abrams et al. | |
| 6,601,175 B1 | 7/2003 | Arnold et al. | |
| 6,611,201 B1 | 8/2003 | Bishop et al. | |
| 6,611,686 B1 | 8/2003 | Smith et al. | |
| 6,615,186 B1 | 9/2003 | Kolls | |
| 6,665,613 B2 | 12/2003 | Duvall | |
| 6,714,859 B2 | 3/2004 | Jones | |
| 6,717,527 B2 | 4/2004 | Simon | |
| 6,741,927 B2 | 5/2004 | Jones | |
| 6,804,606 B2 | 10/2004 | Jones | |
| 6,812,829 B1 | 11/2004 | Flick | |
| 6,816,089 B2 | 11/2004 | Flick | |
| 6,816,090 B2 | 11/2004 | Teckchandani et al. | |
| 6,828,692 B2 | 12/2004 | Simon | |
| 6,868,386 B1 | 3/2005 | Henderson et al. | |
| 6,870,467 B2 | 3/2005 | Simon | |
| 6,873,824 B2 | 3/2005 | Flick | |
| 6,888,495 B2 | 5/2005 | Flick | |
| 6,917,853 B2 | 7/2005 | Chirnomas | |
| 6,924,750 B2 | 8/2005 | Flick | |
| 6,950,807 B2 | 9/2005 | Brock | |
| 6,952,645 B1 | 10/2005 | Jones | |
| 6,961,001 B1 | 11/2005 | Chang et al. | |
| 6,972,667 B2 | 12/2005 | Flick | |
| 6,985,583 B1 | 1/2006 | Brainard et al. | |
| 6,993,658 B1 | 1/2006 | Engberg et al. | |
| 7,005,960 B2 | 2/2006 | Flick | |
| 7,015,830 B2 | 3/2006 | Flick | |
| 7,020,798 B2 | 3/2006 | Meng et al. | |
| 7,031,826 B2 | 4/2006 | Flick | |
| 7,031,835 B2 | 4/2006 | Flick | |
| 7,039,811 B2 | 5/2006 | Ito | |
| 7,053,823 B2 | 5/2006 | Cervinka et al. | |
| 7,061,137 B2 | 6/2006 | Flick | |
| 7,091,822 B2 | 8/2006 | Flick et al. | |
| 7,103,368 B2 | 9/2006 | Teshima | |
| 7,123,128 B2 | 10/2006 | Mullet et al. | |
| 7,124,088 B2 | 10/2006 | Bauer et al. | |
| 7,133,685 B2 | 11/2006 | Hose et al. | |
| 7,149,623 B2 | 12/2006 | Flick | |
| 7,205,679 B2 | 4/2007 | Flick | |
| 7,224,083 B2 | 5/2007 | Flick | |
| 7,266,507 B2 | 9/2007 | Simon et al. | |
| 7,299,890 B2 | 11/2007 | Mobley et al. | |
| 7,323,982 B2 | 1/2008 | Staton et al. | |
| 7,327,250 B2 | 2/2008 | Harvey | |
| 7,379,805 B2 | 5/2008 | Olsen, III et al. | |
| 7,389,916 B2 | 6/2008 | Chirnomas | |
| 7,561,102 B2 | 7/2009 | Duvall | |
| 7,823,681 B2 | 11/2010 | Crespo et al. | |
| 7,873,455 B2 | 1/2011 | Arshad et al. | |
| 7,877,269 B2 | 1/2011 | Bauer et al. | |
| 7,930,211 B2 | 4/2011 | Crolley | |
| 8,018,329 B2 | 9/2011 | Morgan et al. | |
| 8,095,394 B2 | 1/2012 | Nowak et al. | |
| 8,140,358 B1 | 3/2012 | Ling et al. | |
| 8,217,772 B2 | 7/2012 | Morgan et al. | |
| 8,370,027 B2 | 2/2013 | Pettersson et al. | |
| 8,370,925 B2 * | 2/2013 | Childress et al. | 726/18 |
| 8,510,556 B2 * | 8/2013 | Cao et al. | 713/169 |
| 2001/0040503 A1 | 11/2001 | Bishop | |
| 2002/0019055 A1 | 2/2002 | Brown | |
| 2002/0193926 A1 | 12/2002 | Katagishi et al. | |
| 2003/0036823 A1 | 2/2003 | Mahvi | |
| 2003/0151501 A1 | 8/2003 | Teckchandani et al. | |
| 2003/0191583 A1 | 10/2003 | Uhlmann et al. | |
| 2004/0088345 A1 | 5/2004 | Zellner et al. | |
| 2004/0153362 A1 | 8/2004 | Bauer et al. | |
| 2004/0176978 A1 | 9/2004 | Simon et al. | |
| 2004/0177034 A1 | 9/2004 | Simon et al. | |
| 2004/0203974 A1 | 10/2004 | Seibel | |
| 2004/0204795 A1 | 10/2004 | Harvey et al. | |
| 2004/0239510 A1 | 12/2004 | Karsten | |
| 2005/0017855 A1 | 1/2005 | Harvey | |
| 2005/0033483 A1 | 2/2005 | Simon et al. | |
| 2005/0134438 A1 | 6/2005 | Simon | |
| 2005/0162016 A1 | 7/2005 | Simon | |
| 2005/0270178 A1 | 12/2005 | Ioli | |
| 2006/0059109 A1 | 3/2006 | Grimes | |
| 2006/0108417 A1 | 5/2006 | Simon | |
| 2006/0111822 A1 | 5/2006 | Simon | |
| 2006/0122748 A1 | 6/2006 | Nou | |
| 2006/0136314 A1 | 6/2006 | Simon | |
| 2007/0010922 A1 | 1/2007 | Buckley | |
| 2007/0176771 A1 | 8/2007 | Doyle | |
| 2007/0185728 A1 | 8/2007 | Schwarz et al. | |
| 2007/0194881 A1 | 8/2007 | Schwarz et al. | |
| 2008/0114541 A1 | 5/2008 | Shintani et al. | |
| 2008/0162034 A1 | 7/2008 | Breen | |
| 2008/0221743 A1 | 9/2008 | Schwarz et al. | |
| 2009/0043409 A1 | 2/2009 | Ota | |
| 2009/0182216 A1 | 7/2009 | Roushey, III et al. | |
| 2010/0148947 A1 | 6/2010 | Morgan et al. | |
| 2010/0268402 A1 | 10/2010 | Schwarz et al. | |
| 2011/0050407 A1 | 3/2011 | Schoenfeld et al. | |
| 2011/0057800 A1 | 3/2011 | Sofer | |
| 2011/0084820 A1 | 4/2011 | Walter et al. | |

FOREIGN PATENT DOCUMENTS

| | | |
|---|---|---|
| WO | 2007/092272 | 8/2007 |
| WO | 2007/092287 | 8/2007 |
| WO | 2010/068438 | 6/2010 |

OTHER PUBLICATIONS

Credit Chip 200G Series and the Credit Chip 200G Series, C-Chip Technologies Corp., date unknown.

C-Chip Technologies User Guide, C-Chip Technologies Corp., date unknown.

Fogerson, R. et al. "Qualitative Detection of Opiates in Sweat by EIA and GC-MS." Journal of Analytical Toxicology; Oct. 6, 1997. vol. 21, No. 6, pp. 451-458(8) (Abstract).

De La Torre, R. et al. "Usefulness of Sweat Testing for the Detection of Cannabis Smoke." 2004 American Association for Clinical Chemistry, Inc., 29th Arnold O. Beckman Conference; Apr. 12-13, 2011; San Diego, CA.

On Time Payment Protection Systems, printed Jan. 2, 2004 from www.ontime-pps.com/how.html.

Aircept Products, printed Jan. 2, 2004 from www.aircept.com/products.html.

How PayTeck Works, printed Jan. 2, 2004 from www.payteck.cc/aboutpayteck.html.

(56) References Cited

OTHER PUBLICATIONS

Article: "Pager Lets You Locate Your Car, Unlock and Start it", published Dec. 10, 1997 in USA Today.
Article: "Electronic Keys Keep Tabs on Late Payers", published Sep. 22, 1997 in Nonprime Auto News.
Article: "PASSTEC Device Safely Prevents Vehicles from Starting", published Jul. 19, 1999 in Used Car News.
Payment Clock Disabler advertisement, published May 18, 1998.
Secure Your Credit & Secure Your Investment (PayTeck advertisement), printed Jan. 2, 2004 from www.payteck.cc.
iMetrik Company Information, printed Dec. 21, 2006 from imetrik.com.
About C-CHIP Technologies, printed Dec. 21, 2006 from www.c-chip.com.
Hi-tech tools to solve traditional problems, printed Dec. 21, 2006 from www.c-chip.com.
C-CHIP Technologies' Products: Credit Chip 100, Credit Chip 100C, Credit Chip 200, printed Dec. 21, 2006 from www.c-chip.com.

\* cited by examiner

ENCODING A VALIDITY PERIOD IN A PASSWORD

CROSS-REFERENCE TO RELATED APPLICATIONS

The present application claims priority as a continuation of U.S. Utility patent application Ser. No. 10/856,968 for "Encoding Data in a Password," filed May 28, 2004 (now U.S. Pat. No. 7,650,509), the disclosure of which is incorporated herein by reference.

U.S. Utility patent application Ser. No. 10/856,968 claimed priority from U.S. Provisional Patent Application Ser. No. 60/539,892 for "Tracking and Enforcing Vehicle Payments," filed Jan. 28, 2004, the disclosure of which is incorporated herein by reference.

BACKGROUND OF THE INVENTION

1. Field of the Invention

The present invention relates to generating and authenticating passwords that include encoded information such as an expiry date or time period.

2. Description of the Related Art

Passwords are often used to selectively permit access to a resource, machine, vehicle, building, or the like. In many situations, it is desirable to provide such access for a limited period of time. For example, a device may be installed in a vehicle to selectively disable the vehicle if the owner or lessee fails to make payments; in such a device, a password may be provided that expires after a period of time, requiring the owner or lessee to obtain a new password each time he or she makes a payment on the vehicle. As an another example, a time-limited password may be provided to allow an individual to use a software application for a trial period, after which a payment may be required. As another example, a password may grant access to a restricted area of a building for a limited period of time, after which the password expires and can no longer be used to obtain access. In all of these situations, it is desired to provide a password that expires after some predetermined period of time or upon occurrence of some event.

In order for such a time-limited password scheme to function properly, it is useful to communicate the password expiry date to the authentication mechanism, so that the authentication mechanism can determine whether an entered password is still valid. For example, the expiry date for each password can be stored in a database that the authentication mechanism accesses when a password is entered. The authentication mechanism can look up the appropriate record in the database, based on the entered password, or a user identifier or other database lookup key. Then, in addition to verifying the authenticity of the password, the authentication mechanism can determine whether or not the password has expired, and grant or deny access to the resource accordingly.

Such a scheme presumes that the authentication mechanism has some means for accessing a database or other dynamic information repository in which expiry dates can be stored. In many cases, such access is undesirable, impractical, or impossible. The authentication mechanism may be implemented in a device that has no reliable network access, such as a vehicle, or a lock on a remote building. Alternatively, there may be a need for high reliability and/or speed that would be compromised if the system were required to rely on a network connection or other means for database access.

What is needed is a scheme for implementing passwords having expiry dates, without requiring that the authentication mechanism have access to a database or other source of expiry dates. What is further needed is a scheme for encoding the expiry date of a password within the password itself, without compromising the security or effectiveness of the password. What is further needed is a scheme for encoding an expiry date (or similar information) in a manner that does not unduly lengthen the password so as to make it difficult for a user to remember or enter.

What is further needed is a scheme for encoding identifiers or other information-carrying data items in passwords, without unduly lengthening the passwords and without unduly increasing the burden on a user. What is further needed is a scheme for encoding such information in a password reliably. What is further needed is a scheme that provides some assurance of accuracy and authenticity in the encoded information, and that reduces the possibility of tampering.

SUMMARY OF THE INVENTION

According to the techniques of the present invention, an authentication mechanism is provided that is capable of determining whether a password has expired without referring to a database or other information repository.

In addition, in one embodiment the invention provides a technique for encoding additional information in a password without unduly lengthening the password, so that the additional information can be extracted from the password when the user provides the password for authentication purposes. Thus, the password serves as an information-carrying data item as well as acting as an authentication mechanism. For example, it may be useful to encode, in a password, information specifying an access level, or specifying a warning period before password expiry, or the like.

A password generator provides a password to a user, for allowing time-limited use of a resource. The password may be communicated to the user via telephone, secure e-mail, secure postal delivery, or the like.

The user enters the password at an authentication terminal or input device, in order to gain access to the resource. In one aspect, the present invention is implemented using an infrared (IR) remote device for inputting a password. The user enters the password on a keypad on the remote device, and the remote device transmits the user-entered password to a receiver that includes or is coupled to an authentication mechanism. Alternatively, the user can enter the password using a keypad or other input device directly connected to the authentication mechanism.

The authentication mechanism determines whether the entered password is valid and unexpired; if so, it allows access to the resource. For example, the receiver and authentication mechanism may be coupled to the ignition mechanism of a vehicle, so as to disable the vehicle unless the user enters a valid, unexpired password. In one embodiment, the authentication mechanism extracts additional information from the entered password, and performs additional actions or provides feedback according to the additional information. For example, a warning period may be encoded in the password, in which case the authentication mechanism (or some other component) determines whether to display a warning to the user that the password will soon expire. Other information may also be encoded in the password.

In one aspect, the present invention avoids the need to transmit sensitive information across unsecured communication channels. Data used for password authentication and validation is independently generated at the password generator and at the authentication mechanism. The authentication mechanism and the password generator each include an internal clock that is capable of supplying the current date. Where time and date stamps are used as part of the authentication and validation mechanism, tolerances are provided to account for possible discrepancies between internal clocks.

In one aspect, a password is generated as follows. A password generator forms a data packet that includes data to be encoded in the password (for example, the number of days before password expiry, the number of warning days, and the like). The password generator obtains a date stamp from its internal clock, and retrieves or generates a secret key, which can be static or dynamic. The data packet, secret key, and date stamp are combined to form a string. A hash function is applied to the string, to generate a checksum. The checksum is combined with the data packet to generate a password, which is provided to the user.

In one aspect, after a user enters a password, the password is authenticated as follows. The checksum and the data packet are extracted from the password. The data packet is parsed to obtain the encoded data. The authentication mechanism independently retrieves or generates the secret key that was used to generate the password, and also independently obtains a date stamp from an internal clock. The extracted checksum is verified by combining the extracted data packet with the secret key and with the date stamp to generate a string, and by applying the hash function to the string to generate a verification checksum. The verification checksum is compared with the extracted checksum to determine whether the password is authentic.

In one aspect, if the checksums do not match, the authentication steps are repeated using different date stamps that fall within a predefined range of the current date stamp. Thus, the invention accounts for discrepancies between the internal clock of the password generator and that of the authentication mechanism.

The authentication mechanism uses the encoded password expiry data to determine whether the password is unexpired. If the password is authentic and unexpired, the authentication mechanism grants access; otherwise, it denies access.

DETAILED DESCRIPTION OF THE EMBODIMENTS

The present invention provides a mechanism for providing time-limited passwords and for encoding other types of information in passwords. In one embodiment, the present invention is implemented in a device for tracking and enforcing vehicle payments, so as to provide passwords that permit use of a vehicle for a limited time, and that expire after the limited time so that the vehicle can no longer be used unless a new password is entered. New passwords are issued when vehicle payment is timely made, so that the time-limited password acts as a payment enforcement mechanism. Installation of a device employing the techniques of the present invention provides credit-challenged users with an opportunity to buy or lease a vehicle, and further provides auto dealers and financial institutions strong leverage over late and skipped payments.

Although, for illustrative purposes, the following description sets forth the invention in the context of a vehicle payment tracking and enforcement system, one skilled in the art will recognize that the techniques of the present invention can be applied in many other contexts, devices, and environments. In general, the present invention can be implemented whenever it is desirable to encode an expiry date or other information in a password, without unduly lengthening the password and without compromising security or burdening the user.

In one embodiment, the techniques of the present invention are used to enable or disable a vehicle according to whether an entered password is authentic and further according to whether the password has expired. Accordingly, the invention is implemented, in one embodiment, in a password authentication device installed in a vehicle being sold, leased, or rented. The device is connected to the vehicle's starter circuitry. Auditory warnings, such as beeps, are given before a payment is due; if a payment is not received, the unit prevents the vehicle from being started. Thus, users who fail to pay their car payments on time are unable to drive their vehicles.

When a password is authenticated, and when it is determined to be unexpired, the onboard device provides a closed relay path to the starter solenoid in order to allow the user to start the vehicle. In some embodiments, the system also includes added security features to foil jump-starts and other starts attempted without using the ignition key.

Figure 1:
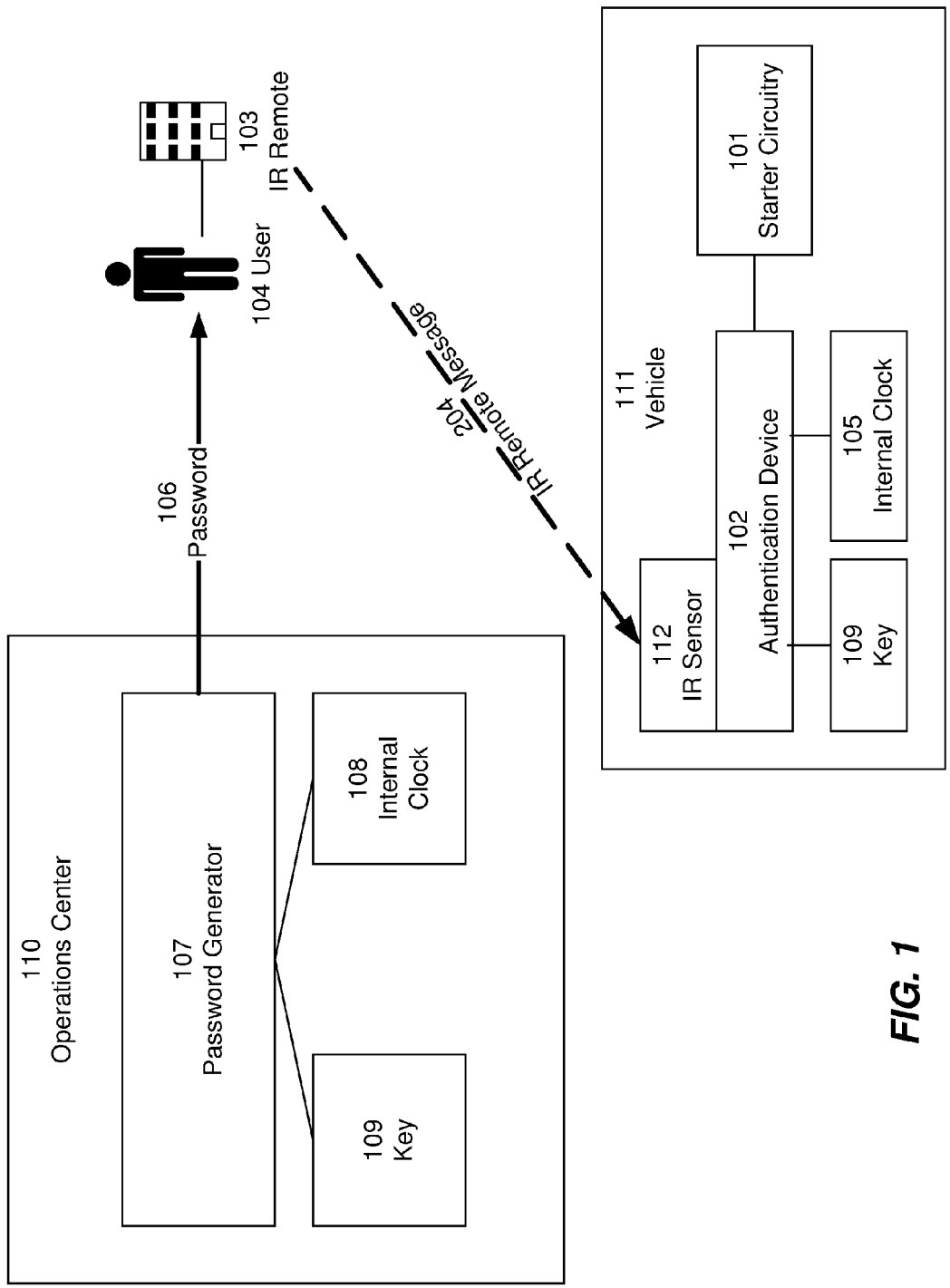
FIG. 1 depicts an overall architecture for an embodiment of the invention.

Referring now to FIG. 1, there is shown an overall architecture for an embodiment of the invention as implemented in a vehicle payment tracking and enforcement system. Authentication device 102 is installed in vehicle 111 so that it can enable and disable starter circuitry 101 according to whether passwords are authentic and unexpired. Authentication device 102 uses an internal clock 105 and a secret key 109 (or a key generation mechanism), to authenticate entered passwords, as will be described in more detail below.

In one embodiment, infrared (IR) sensor 112 is coupled to authentication device 102 to receive IR signals received from a remote control device 103. Each time user 104 makes a payment, password generator 107, located at an operations center 110, generates a new password 106, using techniques described in more detail below. As described below, password generator 107 makes use of secret key 109, to generate passwords 106. The new password 106 is provided to user 104 (for example via telephone, or via a secure Internet website, secure email or the like). User 104 enters password 106 via numeric keys on remote control device 103, in order to enable vehicle 111 to be started.

Each password 106 allows use of vehicle 111 for a length of time, possibly including a grace period. Once this time period has expired, user 104 is required to enter a new password 106, which he or she receives upon making timely payment. In some embodiments, password 106 entry is not required every time vehicle 111 is started, but is required when a payment is due or on some periodic basis. As described in more detail below, each password 106 carries expiry date information, and optionally carries additional information such as a warning period, device identifier, and the like.

In one embodiment, password generator 107 generates an initial password 106 to be issued to user 104 when he or she takes possession of vehicle 111. Then, when the vehicle 111 dealer (or other payee) receives a vehicle payment, password generator 107 generates and issues a new password 106 carrying new expiry date information to reflect the fact that payment has been made. In one embodiment, a dealer, payee, operator, or other individual interacting with operations center 110 can specify an expiry date, warning period, or the like; in another embodiment such parameters are set automatically. Password generator 107 can have an associated user interface (not shown) to allow an operator or other individual to set parameters and otherwise interact with generator 107. In one embodiment, password generator 107 is implemented as a software application, such as a Microsoft Access-based application running on a conventional personal computer. In another embodiment, password generator 107 is implemented as a web-based application accessible by a dealer, payee, or other individual.

In one embodiment, according to the techniques described below, a warning time period is encoded in password 106. When authentication device 102 determines that password 106 has not yet expired, but that the current date is within the warning time period of the password expiry date, device 102 outputs an alert, such as for example a distinctive 10-second tone that is sounded when user 104 starts vehicle 111.

In one embodiment, the warning time period is not encoded in password 106, but is derived from the number of days the password is valid. For example, if password 106 is valid for 30 to 90 days, the warning function is activated when there are 5 days remaining before expiry; the warning function continues through the grace period (if any) or until payment is received (in which case a new password 111 is issued). If password 106 is valid for 10 to 29 days, the warning function is activated when there are 3 days remaining. If password 106 is valid for less than 10 days, the warning function is activated when 15% of the validity period remains. Other schemes for configuring the length of the warning period and/or the grace period are also possible.

Additional features, while not essential characteristics of the present invention, can also be incorporated in the functionality of device 102.

In one embodiment, device 102 includes an audio transducer (not shown) in order to provide user 104 with auditory feedback, such as a beep, that indicates a correct remote control key entry and operating mode. This component can also be used to provide other types of auditory feedback. In one embodiment, a visual indicator such as an LED can be provided instead of or in addition to the auditory device.

In one embodiment, the payee (such as the dealer or lessor of the vehicle) transmits password 106 directly to device 102 when a payment is made. Such transmission can take place, for example, via wireless pager or other onboard wireless connection device (not shown in FIG. 1). Thus, user 104 need not manually enter a password. In one embodiment, each time the onboard device receives password 106 wirelessly, a tone or ring sounds at first startup indicating that password 106 has been accepted.

Interaction Diagram

Figure 2:
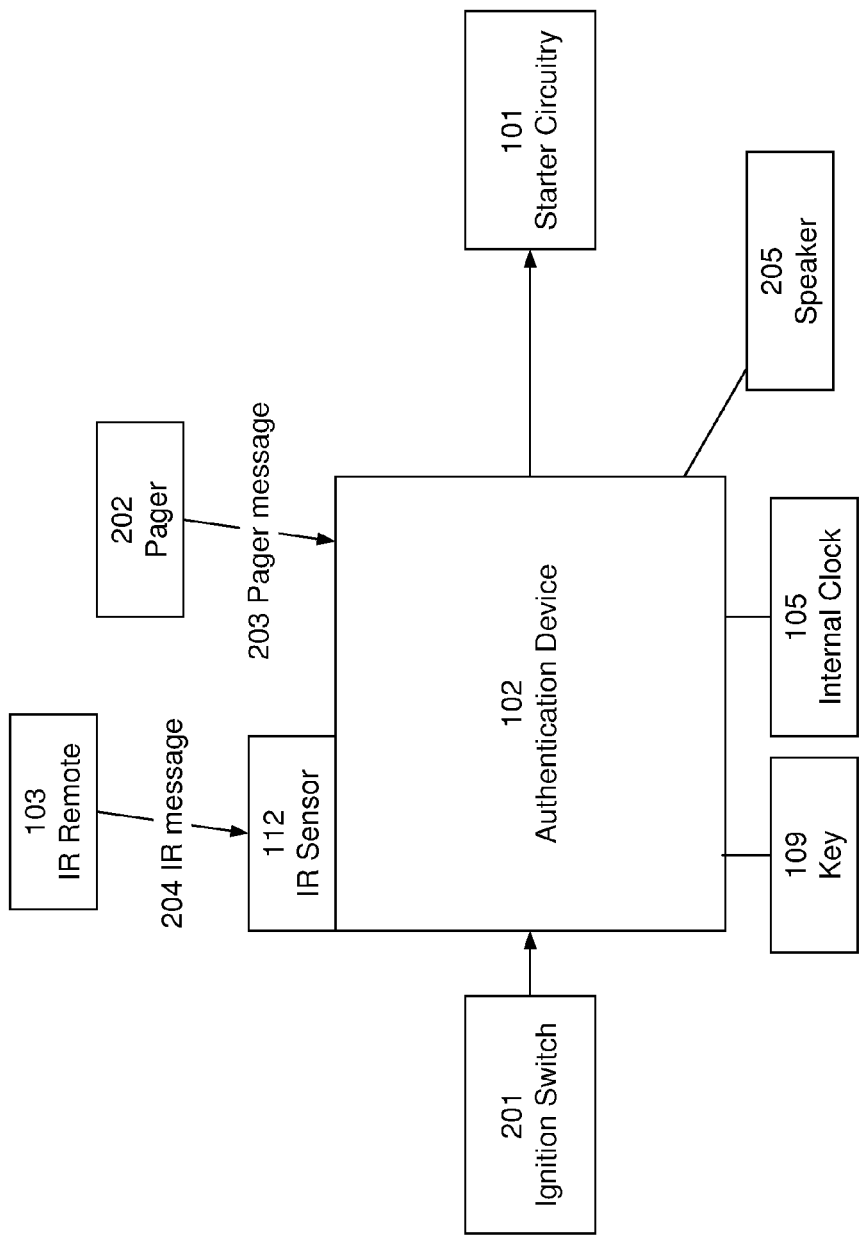
FIG. 2 is a block diagram depicting interaction of an authentication device with other components, according to one embodiment.

Referring now to FIG. 2, there is shown a block diagram depicting interaction of authentication device 102 with other components, according to one embodiment.

Authentication device 102, in one embodiment, includes hardware and firmware for authenticating received passwords 106 and extracting encoded data therefrom. Authentication device 102 is electrically coupled to physical ignition switch 201 and to starter circuitry 101, so that device 102 is able to selectively enable or disable starter circuitry 101 as appropriate. In one embodiment, authentication device 102 is equipped to receive pager messages 203 from pager 202 and/or infrared messages 204 from IR remote device 103. Messages 203 and 204 contain, for example, passwords 106 to be authenticated, whether provided by user 104 or by operations center 110 directly. In one embodiment IR sensor 112 is included to receive IR messages 204 and provide such messages 204 to device 102.

In one embodiment, device 102 has access to key 109 (or to a key generation mechanism that operates deterministically) and clock 105, which are used as described below to authenticate passwords 106. In one embodiment, device 102 includes or is connected to speaker 205 (and/or other output device, such as an LED or display screen, not shown) for providing auditory and/or other feedback to user 104, to indicate for example whether a password 106 has been authenticated and/or whether a warning period is in effect.

In one embodiment, pager 202 receives messages from a central server, located for example at operations center 110. Pager 202 sends these messages 203 to a component of device 102 such as a PIC® microcontroller (available from Microchip Technology Inc. of Chandler, Ariz.) via a Universal Asynchronous Receiver/Transmitter (UART) connection. Handshaking is done with Request to Send (RTS) and Clear to Send (CTS) lines, according to an interface such as provided in a FLEX™ Telemetry messaging receiver (TMR1F), available from Daviscomms (S) Pte. Ltd. of Singapore.

In one embodiment, user 104 enters passwords via a keypad on IR remote device 103. Remote device 103 transmits, to IR sensor 112, an IR message 204 containing the entered password. In one embodiment, IR remote device 103 uses a Holtek HT6221/HT6222 or compatible encoder, available from Holtek Semiconductor, Inc., of Taiwan. IR sensor 112 is implemented, in one embodiment, using a receiver such as the TSOP1238 IR Receiver, available from Vishay Intertechnology, Inc. of Malvern, Pa.

Figure 3:
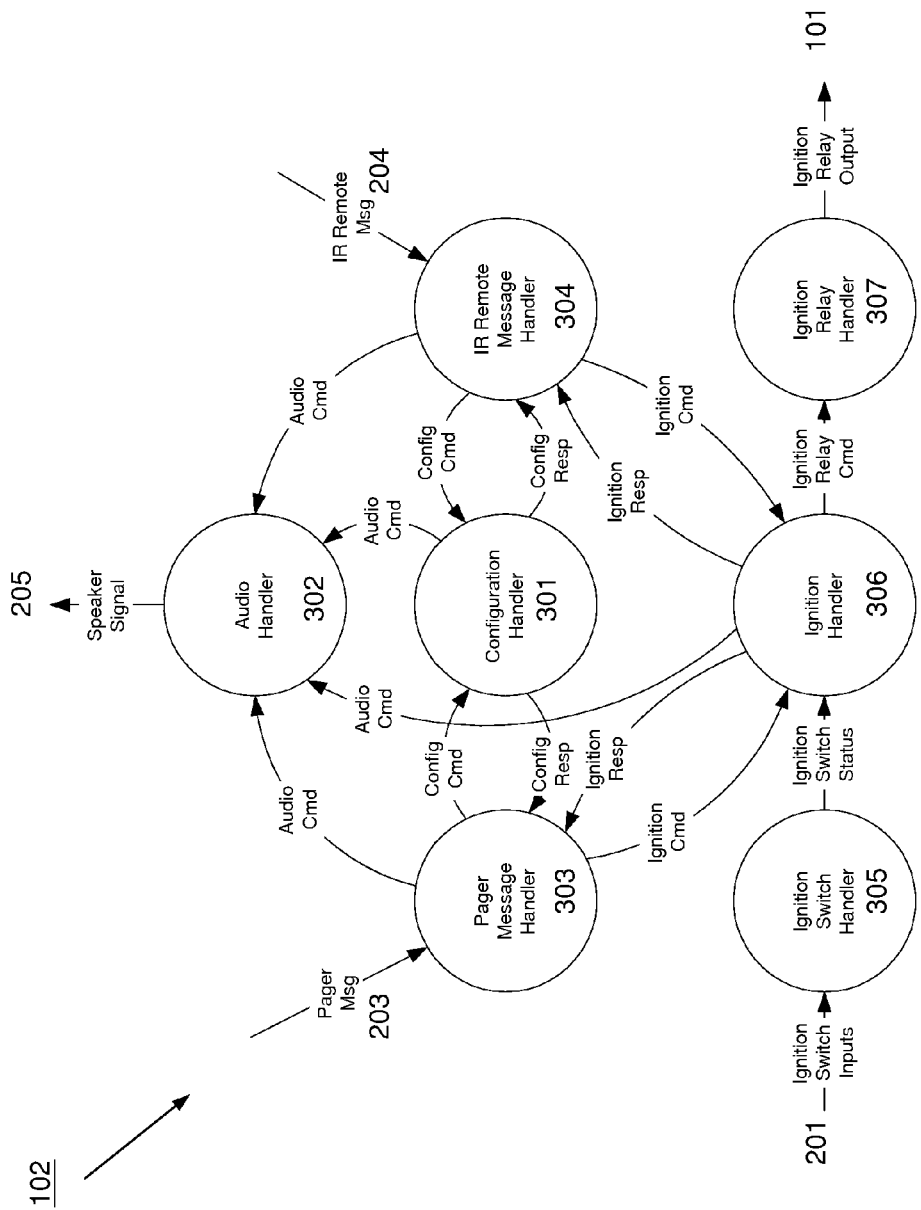
FIG. 3 is a data flow diagram illustrating the main processes of an authentication device, according to one embodiment.

Referring now to FIG. 3, there is shown a data flow diagram illustrating the main processes of authentication device 102, according to one embodiment. IR Remote Message Handler 304 reads and decodes incoming IR Remote messages 204. Pager Message Handler 303 reads and decodes incoming pager messages 203. Configuration Handler 301 manages configuration data such as User Id, Keys, Time Stamps, Valet Password, and the like. Ignition Switch Handler 305 reads the status of Ignition Switch 201 (OFF, ON or START). Ignition Handler 306 decides, based on password authentication methods described herein, whether starter circuitry 101 shall be enabled or disabled. Ignition Relay Handler 307 controls starter circuitry 101.

In one embodiment, audio handler 302 is provided for generating audio tones to be played on speaker 205.

In one embodiment, the various components depicted in FIG. 3 are implemented in firmware running on a PIC® microcontroller such as the PIC16F876A CMOS FLASH-based 8-bit microcontroller, available from Microchip Technology Inc. of Chandler, Ariz. In other embodiments, these components may be implemented as software, hardware, and/or firmware in any type of architecture or device.

Figure 4:
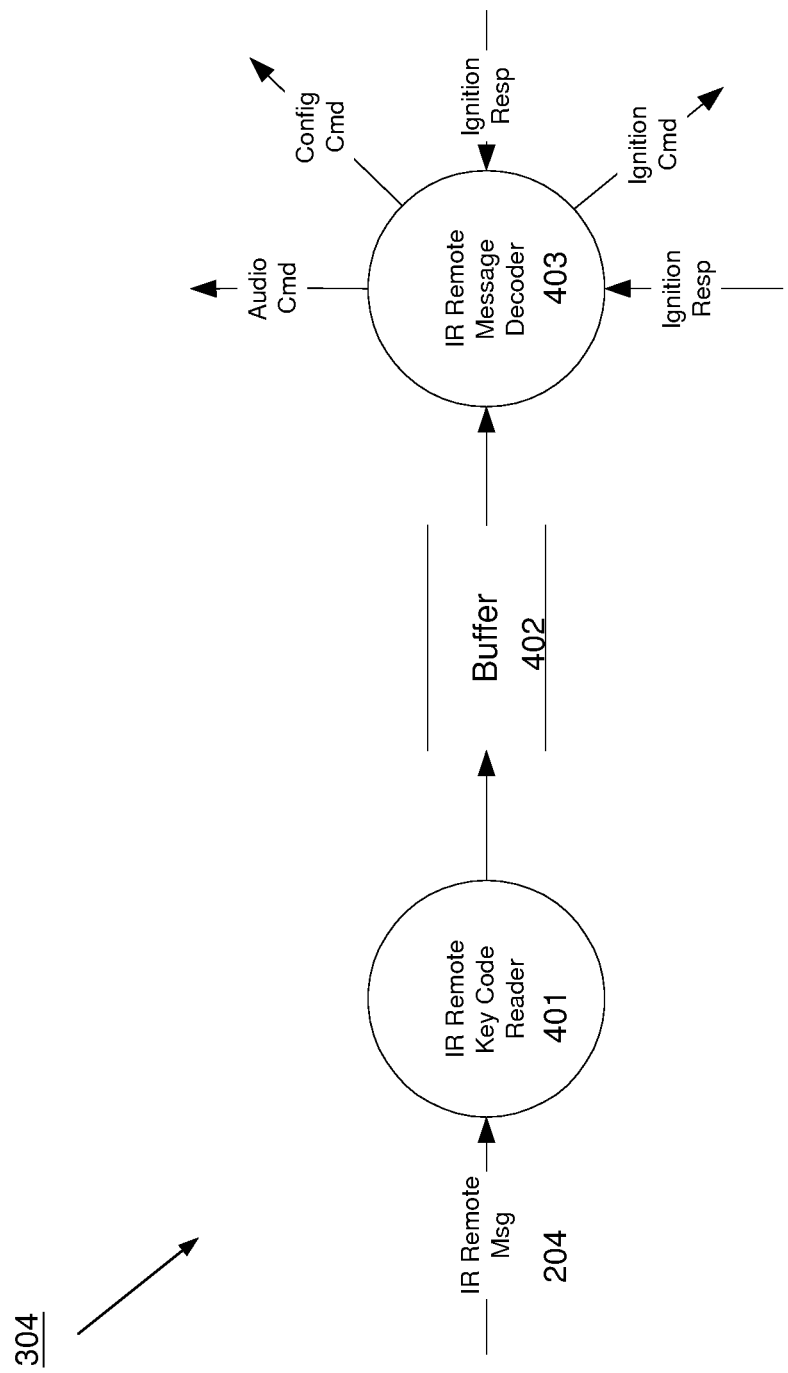
FIG. 4 is a functional diagram of an IR remote message handler, according to one embodiment.

Referring now to FIG. 4, there is shown a functional diagram of an IR remote message handler 304, according to one embodiment. Handler 304 reads incoming IR remote message 204. Key code reader 401 extracts the information from message 204 that is needed for password authentication. In one embodiment, buffer 402 is provided as a workspace for message information extraction and decoding. IR remote message decoder 403 decodes IR messages 204.

One skilled in the art will recognize that messages 204 can take any form and be organized according to any desired protocol. For example, in one embodiment, messages 204 received from IR remote 103 include a function (for example, one character) and a payload (for example, any number of characters). The function indicates a command or type of operation that is desired, and the payload carries additional data for performing the command (such as password data).

In one embodiment, the payload portion of IR remote message 204 includes password 106, as described in more detail below.

Password Generation and Authentication

Referring again to FIG. 1, password generator 107 at operations center 110 forms password 106 and provides password 106 to user 104. User 104 enters password 106 on IR remote 103, which transmits message 204 (including password 106) to device 102. Device 102 then authenticates password 106. If password 106 is authenticated, device 102 enables starter circuitry 101. If password 106 is not authenticated, device 102 disables starter circuitry 101.

Figure 5:
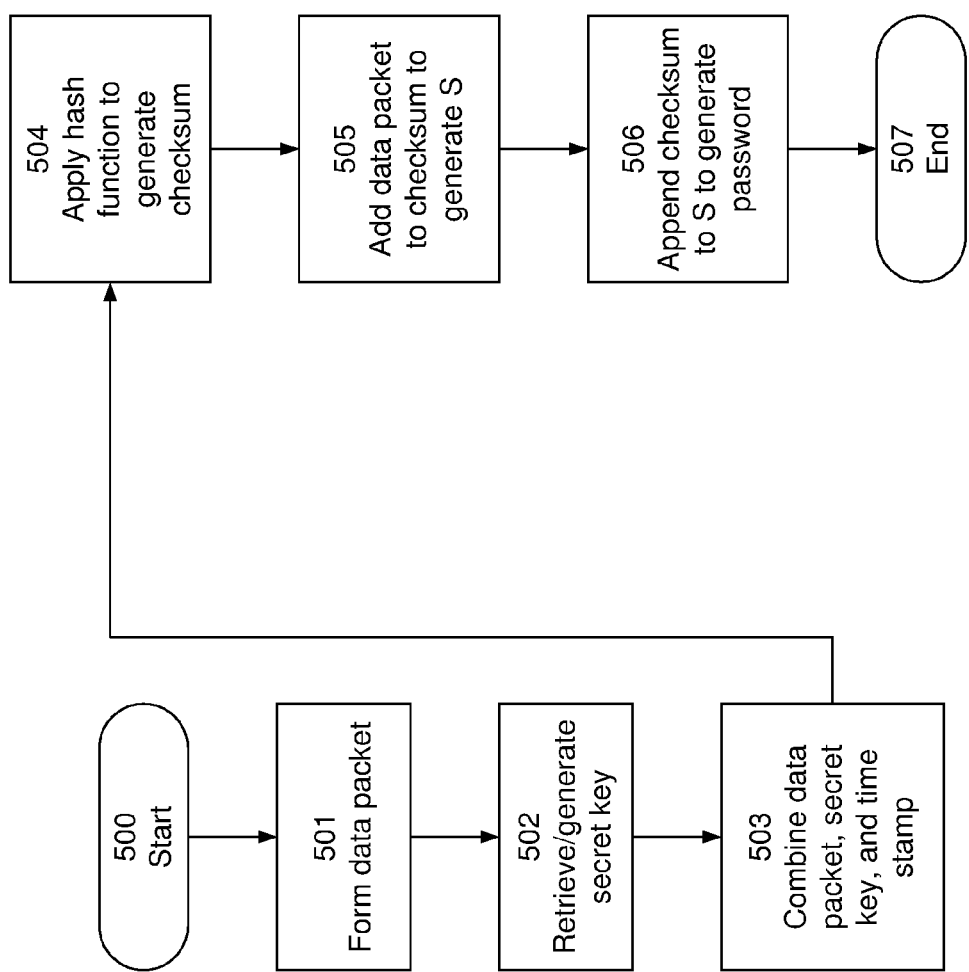
FIG. 5 is a flow diagram depicting a method of generating a password according to one embodiment.

Referring also to FIG. 5, there is shown a flowchart depicting a method for generating password 106 including encoded data, as may be performed by password generator 107 according to one embodiment. Password generator 107 forms 501 a data packet from the data to be encoded in password 106. For example, the number of days before expiry (2 digits), the number of warning days (2 digits), and the number of emergency starts (1 digit), to yield a 5-digit data packet. One skilled in the art will recognize that any other type of data can be encoded, and that the data can take any form and be of any length.

Password generator 107 then retrieves or generates 502 a secret key, for example a four-digit secret key. The key can be static or dynamic, according to well known techniques of key generation.

In one embodiment, multiple secret keys 109 are provided for authenticating passwords 106. The total number of keys 109 is m×n where m is the number of key 109 sets and n is the device ID modulo n, where each device 102 has a unique device ID. For example, m can be 5 and n can be 11. The particular key 109 to be used when generating or authenticating a particular password 106 is determined by selecting a key set using the current key set (plus one for IR messages produced by operations center 110), and selecting an entry within the key set by taking the remainder of the device ID divided by n.

Password generator 107 combines 503 the data packet, secret key, and a current time stamp, to generate a string. The time stamp can be in any form, and can represent the current date and/or time at any desired level of granularity; for example, in one embodiment the time stamp is a five-digit integer indicating the number of days since some fixed date. For example, if the fixed date is Dec. 31, 2001, the time stamp for Jan. 1, 2002 is 00001, for Jan. 31, 2002 is 00031, Jun. 1, 2003 is 00151, Jan. 1, 2003 is 00366 and for Mar. 1, 2003 is 00366+00031+00028=00425.

In one embodiment, the string also includes a unit identifier (for example, a four-digit number) that is unique to the particular device 102, resulting in a different password for each individual device 102.

Password generator 107 applies 504 a hash function to the string, to generate a checksum, which in one embodiment is a 4-digit code. Password generator 107 then adds 505 the data packet to the checksum, to generate a value (S), which in one embodiment is 5 digits in length. Password generator 107 then appends 506 the checksum to value S, to generate a password, which is 9 digits in length.

In one embodiment, password 106 has the following structure:

| Name | Data + Checksum | Checksum |
|---|---|---|
| Size | 5 digits | 4 digits |

Figure 6:
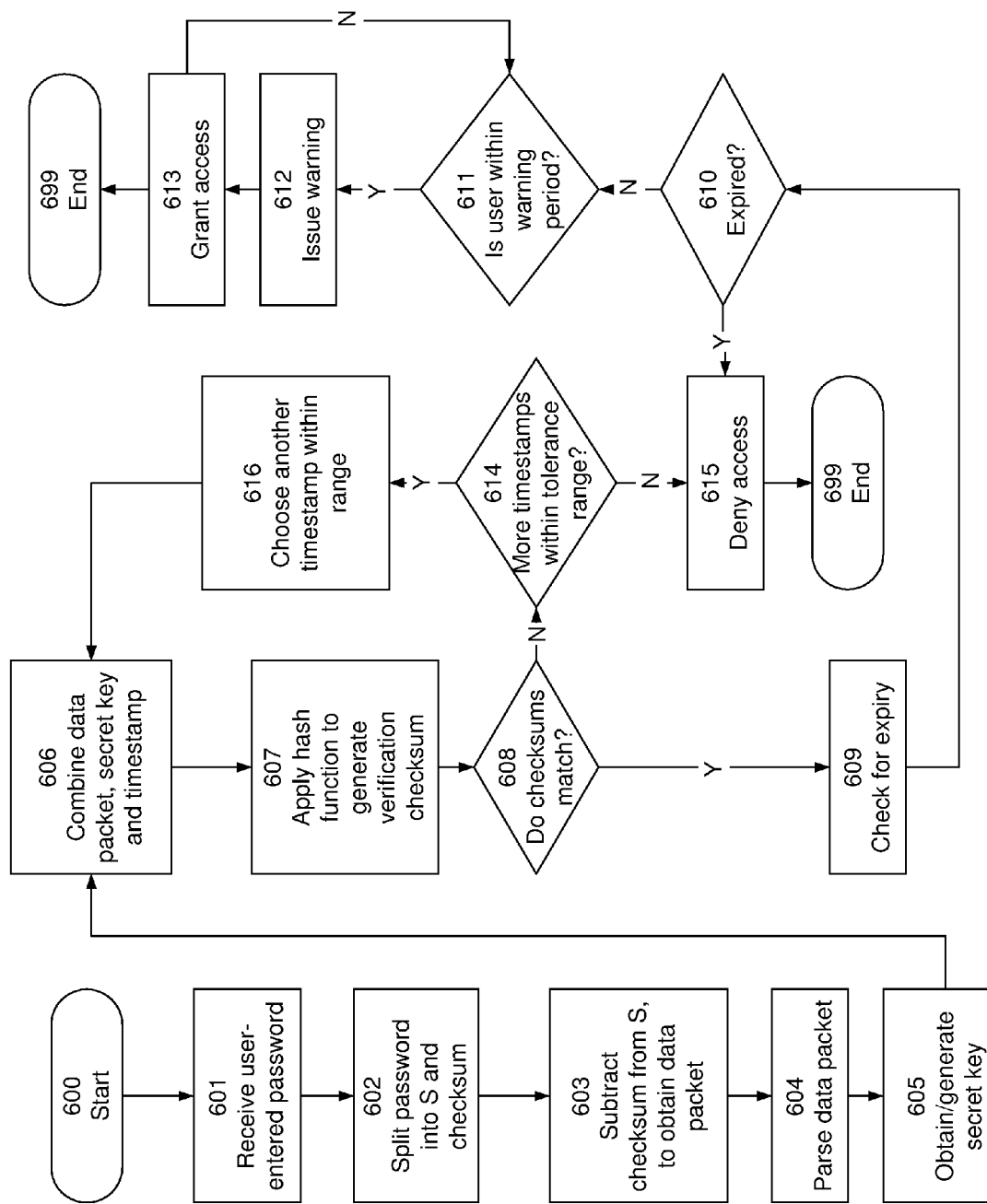
FIG. 6 is a flow diagram depicting a method of authenticating a password according to one embodiment.

Referring now to FIG. 6, there is shown a flowchart depicting a method for authenticating password 106 that has been entered by a user, for example via IR remote 103. Depending on the outcome of the method of FIG. 6, starter circuitry 101 is either enabled or disabled. One skilled in the art will recognize that in other contexts where password authentication is implemented according to the techniques of the present invention, other mechanisms for enabling or disabling access to a resource may be provided.

A user-entered password 106 is received, for example at IR sensor 112. In one embodiment, message 204 contains password 106. Authentication device 102 splits password 106 into two components, designated herein as S and checksum. In one embodiment, S is 5 digits in length and checksum is 4 digits in length.

Device 102 subtracts 603 checksum from S, to obtain a data packet. Device 102 then parses 604 the data packet to obtain the encoded information. Depending on the particular application and context, any type of data can be encoded. For example, encoded data may indicate expiry information for password 106 (how many days the password is effective), the number of warning days to provide, the number of emergency starts to allow, and the like.

In one embodiment, after the checksum is subtracted from the S, the data contains the following structure:

| Name | Regular Days | Warning Days | Emergency Starts |
|---|---|---|---|
| Size | 2 digits | 2 digits | 1 digit |

Next, device 102 verifies the authenticity of the extracted checksum. Device 102 obtains or generates 605 a secret key 109, using for example the same techniques that were performed by password generator 107 in step 502 of FIG. 5. Independently obtaining or generating 605 key 109 at both device 102 and at password generator 107 removes any need to transmit key 109 from one location to another, which could compromise the security of key 109. Once key 109 has been obtained or generated 605, device 102 combines 606 the data packet, the secret key, and a current time stamp, and applies 607 the same hash function that was performed in step 504 by password generator 107. The result of this hash function is referred to as a verification checksum.

In one embodiment, device 102 derives the checksum by applying a hash function to the following:

| Name | Data | Current Key | Unit ID | Time stamp |
|---|---|---|---|---|
| Size | 5 digits | 4 bytes | 4 bytes | 5 digits |

The verification checksum obtained in step 607 is compared with the checksum obtained in step 602. If they do not match, in one embodiment access is denied (for example, starter circuitry 101 is disabled). In another embodiment, to account for the fact that time stamps may not exactly match, verification steps 606 through 608 are repeated using other time stamps within a specified tolerance range of the current time stamp. For example, steps 606 through 608 may be repeated using time stamps ranging from (a) two days in the past or the date of the most recent authenticated message, whichever is later, to (b) five days in the future. One skilled in the art will recognize that any tolerance range can be used. The tolerance range effectively makes allowance for various confounding effects such as possibility that the message may not have been entered immediately, or that the battery that provides power to device 102 has been disconnected for a short period of time since the last valid password 106 was received. In one embodiment, password 106 is validated only if the matching time stamp is greater than that of the most recent valid password 106, so as to minimize the possibility of fraud or of unauthorized multiple uses of the same password 106.

Thus, in embodiments wherein a tolerance range is in effect, device 102 first determines 614 whether any time stamps within the tolerance range have not yet been tried. If all time stamps within the range have been tried without finding a match, device 102 denies access 615 (for example, by disabling starter circuitry 101). If one or more time stamps have not yet been tried, device 102 chooses 616 one of the remaining time stamps within the range and repeats steps 606 through 608.

If, in step 608, the checksums match, device 102 checks 609 whether password 106 has expired, for example by checking an expiration date encoded within password 106 against the current date. In one embodiment, this check is performed before the authentication steps 605 through 608, so that the authentication steps are omitted if password 106 has expired. In another embodiment, password 106 expiry is not checked.

If password 106 has expired 610, device 102 denies access 615 (for example, by disabling starter circuitry 101). If password 106 has not expired 610 (or if password 106 expiry is not checked), device 102 grants access 613 (for example, by enabling starter circuitry 101). In one embodiment, if password 106 has not expired 610, device checks 611 whether a warning period is in effect (for example, by referring to a warning period encoded in password 106); if so, device 102 issues 612 a warning, for example by causing speaker 205 to emit a distinctive tone.

In one embodiment, operations center 110 and device 102 each generate checksums independently (in step 504 and step 607, respectively), so that password authentication can be performed without transmitting the checksum across an unsecured communication channel.

In one embodiment, operations center 110 and device 102 each use time stamps that are independently determined, so that time stamp data need not be encoded in password 106 or otherwise transmitted among the components of the system. Operations center 110 determines its time stamp from internal clock 108, while device 102 uses its own internal clock 105. As described above, in one embodiment the method of the present invention takes into account the possibility of a discrepancy between clocks 108 and 105.

In one embodiment, operations center 110 and device 102 each obtain or generate secret key 109 independently, so as to avoid transmitting key 109 across an unsecured communication channel. In one embodiment, a different key 109 is provided for each device 102, so that operations center 110 maintains an array or database of keys 109 for various devices 102.

As depicted above, in one embodiment authentication device 102 is equipped to receive password 106 sent via pager message 203 and received from pager 202. In one embodiment, the same password encoding, decoding, and authentication techniques are applied regardless of the medium of transport for password 106.

Hash Function

In one embodiment, the hash function used in steps 504 and 607 is a one-way secret function that cannot easily be reverse-engineered. Such one-way hash functions are well known in the art.

In one embodiment, checksums for steps 504 and 607 are generated using the following hash function, expressed in ANSI-C:

```
void munch(uint8 *msg, uint8 n, uint8 r[ ], uint8 rounds)
{
    int i, j;
    i = 0;
    uint16 p[17];
    p[i++] =    0x0ab2;   p[i++] =   0xff3f;   p[i++] =   0xa1a5;
    p[i++] =    0xc3f1;   p[i++] =   0xfab0;   p[i++] =   0x2e1e;
    p[i++] =    0xd946;   p[i++] =   0x5e4c;   p[i++] =   0x4f39;
    p[i++] =    0x5cfc;   p[i++] =   0x5a80;   p[i++] =   0x780a;
    p[i++] =    0x1b39;   p[i++] =   0x9259;   p[i++] =   0xe5f0;
    p[i++] =    0x49af;   p[i++] =   0xb621;
    uint8 k1 = 0, k2 = 0;
    uint16 t = 0;
    for (i = 0; i < n; i++) {
        t = (r[k1] * p[k2]) ^ (msg[i] * p[k2] + 1) ^ (t >> 8);
        r[k1] = t;
        k1 = (k1 + 1) % 16;
        k2 = (k2 + 1) % 17;
    }
    for (i = 0; i < rounds; i++) {
        for (j = 0; j < 16; j++) {
            t = (r[k1] * p[k2]) ^ (t >> 8);
            r[k1] = t;
            k1 = (k1 + 1) % 16;
            k2 = (k2 + 1) % 17;
        }
    }
}
```

This algorithm is a non-invertible hash function that uses the non-linearity of composed multiplication, shifting and exclusive-or for security in the tradition of the Tiny Encryption Algorithm (TEA) or the Helix encryption algorithm. This algorithm can also be implemented efficiently on microcontrollers, according to techniques that are well known in the art. One skilled in the art will recognize that other types of hash functions may also be used without departing from the essential characteristics of the present invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method for encoding a validity period in a vehicle access password for entry by a user, comprising:
    forming a data packet comprising a representation of a validity period for the password, the validity period specifying a time period during which the password permits access to a vehicle;
    generating the password using the data packet and at least one additional data element, the password comprising an encoded representation of the validity period, and the password not being identical to the data packet; and
    transmitting the generated password to a user via an electronic communications medium.

2. The method of claim 1, wherein the representation of a validity period comprises a password expiry date.

3. The method of claim 1, wherein the representation of a validity period comprises a representation of an amount of time.

4. A computer program product for encoding a validity period in a vehicle access password for entry by a user, comprising:
    a non-transitory computer-readable medium; and
    computer program code, encoded on the medium, for:
        forming a data packet comprising a representation of a validity period for the password, the validity period specifying a time period during which the password permits access to a vehicle;
        combining the data packet with at least one additional data element to generate the password comprising an encoded representation of the validity period, the password not being identical to the data packet; and
        transmitting the generated password to a user via an electronic communications medium.

5. The computer program product of claim 4, wherein the representation of a validity period comprises a password expiry date.

6. The computer program product of claim 4, wherein the representation of a validity period comprises a representation of an amount of time.

7. A system for encoding a validity period in a vehicle access password for entry by a user, comprising:
    a data packet formation module, configured to form a data packet comprising a representation of a validity period for the password, the validity period specifying a time period during which the password permits access to a vehicle;
    a password generator, coupled to the data packet formation module, configured to generate the password using the data packet and at least one additional data element, the the password comprising an encoded representation of the validity period, and the password not being identical to the data packet; and
    a password transmission device, coupled to the password generator, configured to transmit the generated password to a user via an electronic communications medium.

8. The system of claim 7, wherein the representation of a validity period comprises a password expiry date.

9. The system of claim 7, wherein the representation of a validity period comprises a representation of an amount of time.

* * * * *